United States Patent
Kim et al.

(10) Patent No.: US 9,077,023 B2
(45) Date of Patent: Jul. 7, 2015

(54) CATHODE ACTIVE MATERIAL HAVING MANGANESE OXIDE AND BORON, CATHODE AND LITHIUM BATTERY INCLUDING CATHODE ACTIVE MATERIAL, AND METHOD OF PREPARING THE CATHODE ACTIVE MATERIAL

(75) Inventors: Min-Ju Kim, Yongin-si (KR);
Yong-Chul Park, Yongin-si (KR);
Gyeong-Jae Heo, Yongin-si (KR);
Hyun-Deok Lee, Yongin-si (KR);
Mi-Ran Song, Yongin-si (KR);
Jin-Hyoung Seo, Yongin-si (KR);
Na-Leum Yoo, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 786 days.

(21) Appl. No.: 13/244,109

(22) Filed: Sep. 23, 2011

(65) Prior Publication Data
US 2012/0177994 A1 Jul. 12, 2012

(30) Foreign Application Priority Data
Jan. 12, 2011 (KR) .................. 10-2011-0003151

(51) Int. Cl.
*H01M 4/131* (2010.01)
*C01G 45/12* (2006.01)
(Continued)

(52) U.S. Cl.
CPC .......... *H01M 4/131* (2013.01); *C01G 45/1242* (2013.01); *C01G 51/12* (2013.01); *C01G 53/54* (2013.01); *C01P 2002/72* (2013.01); *C01P 2004/03* (2013.01); *C01P 2006/12* (2013.01); *C01P 2006/40* (2013.01); *H01M 4/0471* (2013.01); *H01M 4/1391* (2013.01); *H01M 4/364* (2013.01); *H01M 4/485* (2013.01); *H01M 4/505* (2013.01); *H01M 4/525* (2013.01);
(Continued)

(58) Field of Classification Search
CPC ............................ H01M 4/131; H01M 4/1391
USPC .................................. 429/218.1, 224, 231.95
See application file for complete search history.

(56) References Cited

U.S. PATENT DOCUMENTS 7,429,435 B2  9/2008  Nakane et al.
7,648,800 B1  1/2010  Kuyama et al.
(Continued)

FOREIGN PATENT DOCUMENTS

EP  1035075 A1  9/2000
EP  1491504 A1  12/2004
(Continued)

OTHER PUBLICATIONS

Thirunakaran et al., "Solution Synthesis of Boron Substituted LiMn2O4 Spinel Oxide for Use in Lithium Rechargeable Battery", Ionics 10 (2004), 188-191.*
(Continued)

*Primary Examiner* — Zachary Best
(74) *Attorney, Agent, or Firm* — Knobbe Martens Olson & Bear LLP

(57) ABSTRACT

A cathode active material including: a lithium manganese oxide of which primary particles has a diameter of 1 μm or more and which has a spinel structure in which an X-ray diffraction (XRD) peak intensity ratio of I(111)/I(311) is 1.0 or more; and a boron element disposed at least one position selected from the group consisting of inside the primary particles and on surfaces of the primary particles.

18 Claims, 3 Drawing Sheets

(51) Int. Cl.
*C01G 51/12* (2006.01)
*C01G 53/00* (2006.01)
*H01M 4/04* (2006.01)
*H01M 4/1391* (2010.01)
*H01M 4/36* (2006.01)
*H01M 4/485* (2010.01)
*H01M 4/505* (2010.01)
*H01M 4/525* (2010.01)
*H01M 10/0525* (2010.01)
*H01M 4/02* (2006.01)

(52) U.S. Cl.
CPC .... *H01M10/0525* (2013.01); *H01M 2004/021* (2013.01); *H01M 2004/028* (2013.01); *Y02T 10/7011* (2013.01); *Y02E 60/122* (2013.01)

(56) References Cited

U.S. PATENT DOCUMENTS

| | | |
|---|---|---|
| 2009/0050841 A1 | 2/2009 | Sasaki et al. |
| 2011/0210287 A1* | 9/2011 | Koga et al. ............... 252/182.1 |
| 2011/0287319 A1 | 11/2011 | Vogler et al. |

FOREIGN PATENT DOCUMENTS

| | | |
|---|---|---|
| EP | 2214232 A1 | 8/2010 |
| EP | 2214233 A1 | 8/2010 |
| EP | 2330079 A1 | 6/2011 |
| JP | 2002-203550 | 7/2002 |
| JP | 2010-95439 A | 4/2010 |
| KR | 2001-0030298 A | 4/2001 |
| KR | 2003-0077979 A | 10/2003 |
| KR | 100434547 B1 | 5/2004 |
| KR | 10-2008-0031424 A | 4/2008 |
| WO | WO 2009/156119 A1 | 12/2009 |
| WO | WO 2010/032449 A1 | 3/2010 |
| WO | WO 2010032449 A1 * | 3/2010 |

OTHER PUBLICATIONS

Official Action from the Korean Industrial Property Office dated Aug. 31, 2012 in the examination of Korean Patent Application No. 10-2011-0003151, 5 pages.

R. Thirunakaran, Ki-Tae Kim, Yong-Mook Kang and Jai-Young Lee, Solution Synthesis of Boron Substituted $LiMn_2O_4$ Spinel Oxide for Use in Lithium Rechargeable Battery, Ionics, 2004, pp. 188-192, vol. 10, Department of Materials Science Engineering, Korea Advanced Institute of Science and Technology, Yuseong-Gu, Daejon, Republic of Korea.

Extended European Search Report issued by the European Patent Office dated Apr. 4, 2012, 11 pages.

Chinese Office Action dated Dec. 24, 2014 issued in corresponding CN Application No. 2011-10448009.5.

* cited by examiner

CATHODE ACTIVE MATERIAL HAVING MANGANESE OXIDE AND BORON, CATHODE AND LITHIUM BATTERY INCLUDING CATHODE ACTIVE MATERIAL, AND METHOD OF PREPARING THE CATHODE ACTIVE MATERIAL

CROSS-REFERENCE TO RELATED APPLICATIONS

This application claims the benefit of Korean Patent Application No. 10-2011-0003151, filed on Jan. 12, 2011, in the Korean Intellectual Property Office, the disclosure of which is incorporated herein in its entirety by reference.

BACKGROUND

1. Field

One or more embodiments relate to a cathode active material, a cathode including the cathode active material, a lithium battery including the cathode, and a method of preparing the cathode active material.

2. Description of the Related Technology

A lithium transition metal oxide is used as a cathode active material for a lithium battery, and examples of such a lithium transition metal oxide are $LiNiO_2$, $LiCoO_2$, $LiMn_2O_4$, $LiFePO_4$, $LiNi_xCo_{1-x}O_2$ ($0 \leq x \leq 1$), and $LiNi_{1-x-y}Co_xMn_yO_2$ ($0 \leq x \leq 0.5$, $0 \leq y \leq 0.5$).

A lithium cobalt oxide, for example, $LiCoO_2$ is relatively expensive and has a limited electric capacity of about 140 mAh/g. When a charged voltage for $LiCoO_2$ is increased to 4.2 V or more, 50% or more of lithium is removed and is present in the form of $Li_{1-x}CoO_2$ ($x>0.5$) in a battery. $Li_{1-x}CoO_2$ ($x>0.5$) is structurally unstable and its electric capacity is rapidly reduced over a charge and discharge cycle.

A compound that is formed by substituting some of cobalt atoms with other metals in the lithium cobalt oxide, for example, $LiNi_xCo_{1-x}O_2$ ($x=1, 2$) or $LiNi_{1-x-y}Co_xMn_yO_2$ ($0 \leq x \leq 0.5$, $0 \leq y \leq 0.5$) has poor swelling suppression characteristics.

A lithium manganese oxide, for example, $LiMn_2O_4$, is relatively inexpensive and stable at room temperature. In general, a lithium manganese oxide is prepared through a solid state reaction method or a molten salt analysis method at high temperature. A lithium manganese oxide that is formed at high temperature has an unstable structure. Meanwhile, if a lithium manganese oxide is formed at low temperature, its primary particle diameter is reduced and thus its specific surface area is increased. Thus, cycle characteristics and stability of the lithium manganese oxide that is formed at low temperature may be lowered during high-temperature charge and discharge.

SUMMARY

One or more embodiments include a cathode active material.

One or more embodiments include a cathode including the cathode active material.

One or more embodiments include a lithium battery including the cathode.

One or more embodiments include a method of preparing the cathode active material.

Additional aspects will be set forth in part in the description which follows and, in part, will be apparent from the description, or may be learned by practice of the presented embodiments.

According to one or more embodiments, a cathode active material includes: a lithium manganese oxide of which primary particles has a diameter of 1 µm or more and which has a spinel structure in which an X-ray diffraction (XRD) peak intensity ration of I(111)/I(311) is 1.0 or more; and a boron element disposed at least one position selected from the group consisting of inside the primary particles and on surfaces of the primary particles.

According to one or more embodiments, a cathode including the cathode active material as described above.

According to one or more embodiments, a lithium battery includes the cathode as described above.

According to one or more embodiments, a method of preparing a cathode active material includes: mixing a lithium precursor, a manganese precursor, a boron-based compound, and optionally, a dopant precursor to prepare a mixture; and calcinating the mixture at a temperature of about 700 to about 900° C.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
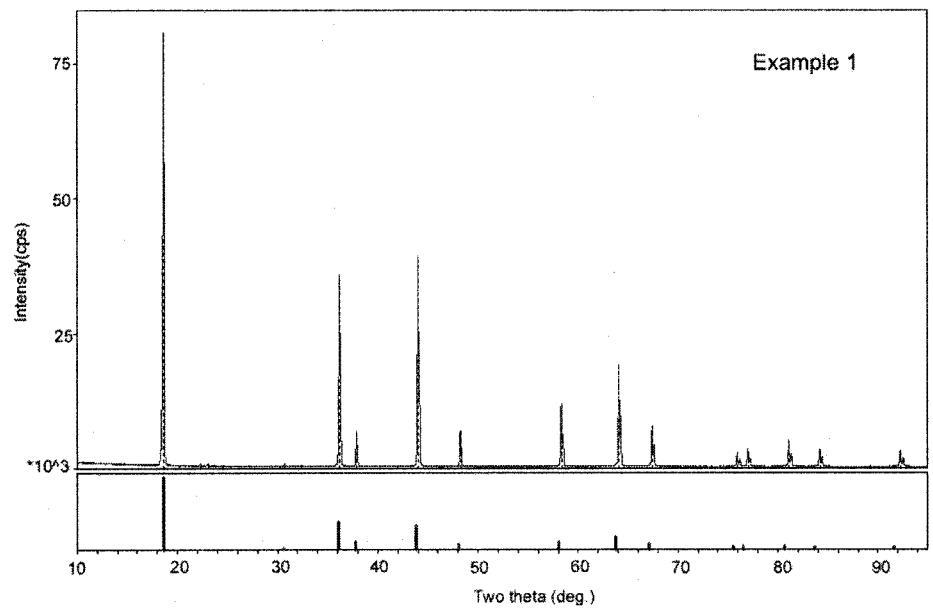
FIG. 1A is an X-ray diffraction (XRD) spectrum of a cathode active material powder prepared according to Example 1.

Reference will now be made to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a cathode active material, a cathode including the cathode active material, a lithium battery including the cathode, and a method of preparing the cathode active material, according to one or more embodiments, will be described in detail.

A cathode active material according to an embodiment includes a lithium manganese oxide of which primary particles has a diameter of 1 µm or more and which has a spinel structure in which an X-ray diffraction (XRD) peak intensity ratio of I(111)/I(311) is 1.0 or more; and a boron element disposed at least one position selected from the group consisting of inside the primary particles and on surfaces of the primary particles.

FIG. 1A shows an XRD spectrum of the cathode active material, having a peak corresponding to a (111) crystal plane at bragg 2θ of 18.5±1° and a peak corresponding to a (311) crystal plane at a bragg angle 2θ of 36.2±0.2°. A peak intensity ratio of the peak corresponding to the (111) crystal plane to the peak corresponding to the (311) crystal plane, for example, I(111)/I(311) is 1.0 or more. For example, a peak intensity ratio of I(111)/I(311) may be about 1.0 to about 3.0. For example, a peak intensity ratio of I(111)/I(311) may be about 1.5 to about 3.0. For example, a peak intensity ratio of I(111)/I(311) may be from about 2.0 to about 3.0.

The cathode active material includes, in addition to the lithium manganese oxide, a boron element inside primary particles of the lithium manganese oxide or on surfaces of primary particles of the lithium manganese oxide. The boron element is a residue of a boron compound that is used in preparing the cathode active material.

Crystallinity of the cathode active material may be improved by increasing the primary particle diameter of the lithium manganese oxide. All or a portion of the lithium manganese oxide may have crystallinity. Due to high crystallinity of the lithium manganese oxide, a battery including the cathode active material may have good charge and discharge characteristics. In addition, leakage of manganese (Mn) may be suppressed and thus, a battery including the cathode active material may have good high-temperature charge and discharge characteristics and high stability at high-temperatures.

The primary particle diameter of the lithium manganese oxide may be from about 5 μm or more. For example, the primary particle diameter of the lithium manganese oxide may be from about 6 μm or more. For example, the primary particle diameter of the lithium manganese oxide may be from about 5 to about 20 μm. For example, the primary particle diameter of the lithium manganese oxide may be from about 5 to about 10 μm. For example, the primary particle diameter of the lithium manganese oxide may be from about 6 to about 10 μm. When the primary particle diameter of the lithium manganese oxide is about 5 μm or more, a battery including the cathode active material may have good charge and discharge characteristics and high high-temperature stability.

In the XRD spectrum of the cathode active material, a full wide at half maximum (FWHM) of a peak at a bragg angle 2θ of 36.2±0.2° with respect to a CuK-alpha characteristic X-ray wavelength of 1.541 Å may be 0.6 or less. For example, the lithium manganese oxide according to the present embodiment has a sharper peak than a lithium manganese oxide that has low crystallinity or is amorphous. For example, the FWHM may be from about 0.01 to about 0.6. For example, the FWHM may be from about 0.2 to about 0.5. For example, the FWHM may be from about 0.2 to about 0.4. For example, the FWHM may be from about 0.25 to about 0.35.

A specific surface area of the cathode active material may be from about 0.2 to about 1.3 m²/g. When the specific surface area of the cathode active material is within the range described above, a battery including the cathode active material may have enhanced charge and discharge characteristics and high-temperature stability.

Secondary particles of the lithium manganese oxide may have an average particle diameter (D50) of about 10 to about 20 μm. The secondary particles refer to behavior particles formed by an agglomeration of a plurality of primary particles. The average particle diameter (D50) of the secondary particles may be measured by using a laser-type particle distribution measurement apparatus. When the average particle diameter (D50) of the secondary particles is within the range described above, a battery including the cathode active material may have enhanced charge and discharge characteristics and high-temperature stability.

An amount of the boron element disposed either inside the primary particles or on surfaces of the primary particles or both inside the primary particles and on surfaces of the primary particles may be about 1 to about 2000 ppm based on the total weight of the cathode active material. For example, the amount of the boron element may be about 100 to about 2000 ppm. For example, the amount of the boron element may be about 400 to about 1800 ppm. For example, the amount of the boron element may be about 400 to about 1000 ppm. For example, the amount of the boron element may be about 400 to about 800 ppm.

The lithium manganese oxide may be represented by Formula 1 below:

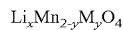  <Formula 1>

$Li_xMn_{2-y}M_yO_4$ where 0.9≤x≤1.4, 0≤y≤1, and M includes one or more metal selected from the group consisting of Al, Co, Ni, Cr, Fe, Zn, Mg, and Li.

For example, the lithium manganese oxide may be represented by Formula 2 below:

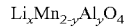  <Formula 2>

$Li_xMn_{2-y}Al_yO_4$ where 0.9≤x≤1.4 and 0≤y≤1.

For example, the lithium manganese oxide may be $LiMn_2O_4$, or $Li_aMn_{2-b}Al_bO_4$ (where 0.9≤a≤1.2, and 0≤b≤0.2).

A cathode according to an embodiment includes the cathode active material. The cathode may be formed by, for example, molding a cathode active material composition including a cathode active material and a binder in a predetermined form, or depositing the cathode active material composition on a current collector, such as a copper foil or an aluminum foil.

For example, the cathode active material as described above, a conducting agent, a binder, and a solvent are mixed to prepare a cathode active material composition. The cathode active material composition is directly coated on a metal current collector to form a cathode plate. Alternatively, the cathode active material composition may be cast on a separate support, and a film separated from the support is laminated on a metal current collector to form a cathode plate. However, the cathode may not be limited thereto.

A conducting agent for use in the cathode may be carbon black or graphite particles, but is not limited thereto. For example, the conducting agent may be any one of various materials that are used as a conducting agent in the art.

A binder for use in the cathode may be a vinylidenefluoride/hexafluoropropylene copolymer, polyvinylidenefluoride (PVDF), polyacrylonitrile, polymethylmetacrylate, polytetrafluoroethylene, a mixture thereof, or a styrene butadiene rubber-based polymer, but is not limited thereto. For example, the binder may be any one of various materials that are used as a binder in the art.

The solvent may be N-methylpyrrolidone (NMP), acetone, or water, but is not limited thereto. For example, the solvent may be any one of various materials that are used in the art.

Amounts of the cathode active material, the conductive agent, the binder, and the solvent used herein may be used at the same levels as used in a traditional lithium battery. According to purpose or structure of the lithium battery, at least one selected from the group consisting of the conducting agent, the binder, and the solvent may be omitted herein.

A lithium battery according to an embodiment includes a cathode including the cathode active material. An example of a method of manufacturing the lithium battery will now be described in detail.

First, a cathode is prepared by using the method described above of forming a cathode.

Then, an anode active material, a conducting agent, a binder, and a solvent are mixed to prepare an anode active material composition. The anode active material composition may be directly coated and dried on a metal current collector to prepare an anode plate. Alternatively, the anode active material composition may be cast on a separate support, and a film separated from the support is laminated on a metal current collector to form an anode plate.

The anode active material may be a compound that enables intercalation and deintercalation of lithium, and may be any one of various materials that are used as an anode active material in the art. Examples of the anode active material are a lithium metal, a lithium alloy, a carbonaceous material, a graphite, and a mixture thereof.

The conducting agent, the binder, and the solvent for use in the anode active material composition may be the same as those used in the cathode active material composition. Also, at least one selected from the group consisting of the cathode active material composition and the anode active material composition may further include a plasticizer to form pores in the cathode or anode plate.

Amounts of the anode active material, the conductive agent, the binder, and the solvent used herein may be used at the same levels as used in a traditional lithium battery. According to a purpose or structure of a lithium battery, at least one selected from the group consisting of the conducting agent, the binder, and the solvent may not be used herein.

Then, a separator that is to be interposed between the cathode and the anode is prepared. The separator may be any one of various separators conventionally used in a lithium battery. The separator may have a low resistance to ion flow and a high electrolytic solution-retaining capability. Examples of the separator are glass fiber, polyester, Teflon, polyethylene, polyprophylene, polytetrafluoroethylene (PTFE), and a combination thereof, and these separators may be in a non-woven or woven fabric form. For example, a separator suitable for a lithium ion battery may be a rollable separator comprising, for example, polyethylene or polypropylene, and a separator suitable for a lithium ion polymer battery may be a separator that has an excellent organic electrolytic solution-retaining capability. An example of a method of forming the separator will now be described in detail.

A polymer resin, a filler, and a solvent are mixed to prepare a separator composition. The separator composition may be directly coated on an electrode and dried to form a separator. Alternatively, the separator composition may be cast on a support, dried, and then separated from the support as a separator film and then the separator film may be laminated on an electrode, thereby forming a separator.

The polymer resin used in forming the separator may not be particularly limited and may be any one of various materials that are used as a binder of an electrode plate in the art. Examples of the polymer are a vinylidenefluoride/hexafluoropropylene copolymer, polyvinylidenefluoride (PVDF), polyacrylonitrile, polymethylmetacrylate, and a mixture thereof.

Then, an electrolyte is prepared.

The electrolyte may be an organic electrolytic solution. In addition, the electrolyte may instead be solid. Examples of the solid electrolyte are boron oxide and lithium oxynitride, but are not limited thereto. The solid electrolyte may be any one of various solid electrolytes used in the art. The solid electrolyte may be formed on the anode by, for example, sputtering.

For example, an organic electrolytic solution may be used as the electrolyte. The organic electrolytic solution may be prepared by dissolving a lithium salt in an organic solvent.

The organic solvent may be any one of various organic solvents used in the art. Examples of the organic solvent are propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, γ-butyrolactone, dioxorane, 4-methyldioxorane, N,N-dimethylformamide, dimethylacetamide, dimethylsulfoxide, dioxane, 1,2-dimethoxyethane, sulforane, dichloroethane, chlorobenzene, nitrobenzene, diethyleneglycol, dimethylether, and a mixture thereof.

The lithium salt may be any one of various lithium salts used in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where each of x and y is a natural number), $LiCl$, $LiI$, and a mixture thereof.

Figure 3:
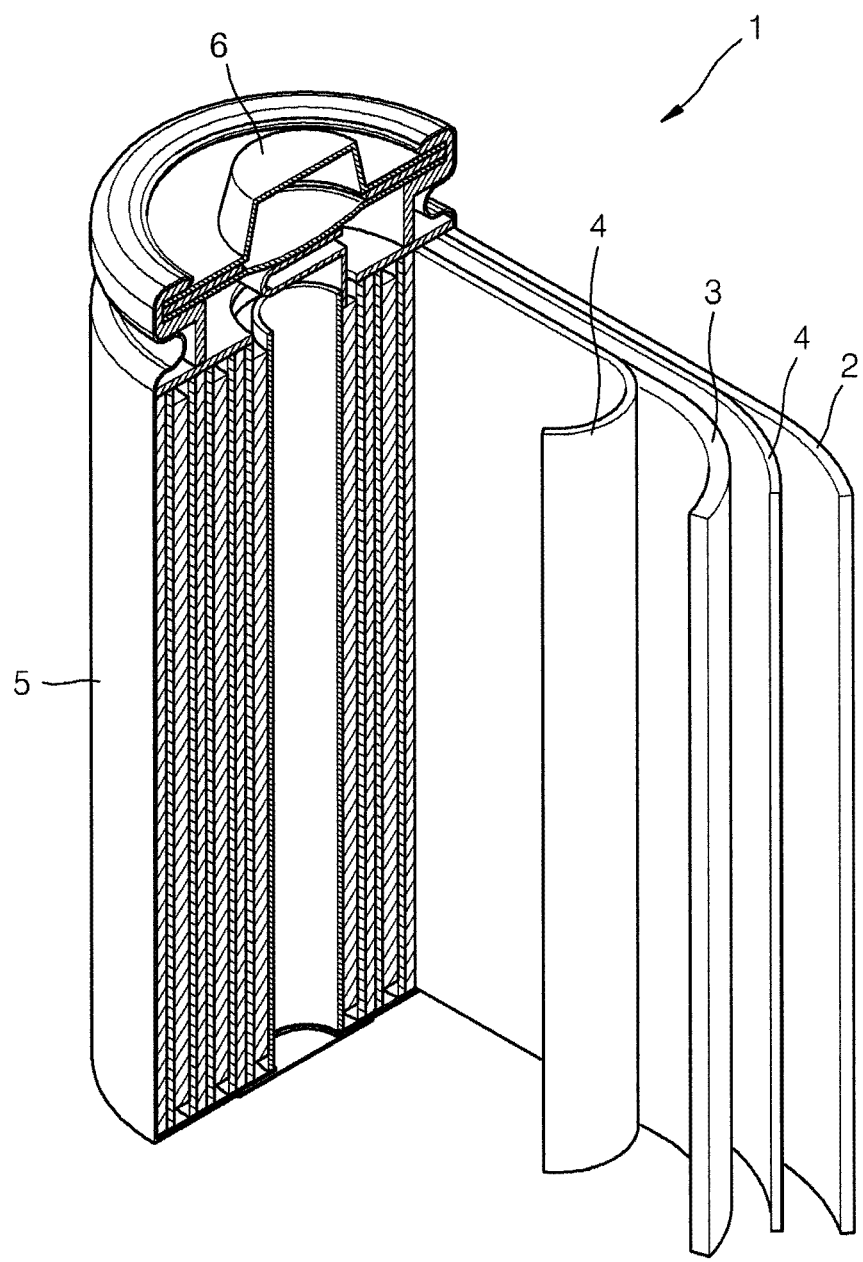
FIG. 3 is a schematic view of a lithium battery according to an embodiment.

Referring to FIG. 3, a lithium battery 1 includes a cathode 3, an anode 2, and a separator 4. The cathode 3, the anode 2, and the separator 4 are wound or folded to be housed in a battery case 5. Then, an organic electrolytic solution is injected into the battery case 5 and the resultant structure is sealed with a cap assembly 6, thereby completely manufacturing the lithium battery 1. The battery case may have a cylindrical, rectangular, or thin-film form. For example, the lithium battery 1 may be a large thin-film type battery. In another embodiment, the lithium battery 1 may be a lithium ion battery.

Meanwhile, a battery assembly may be formed by interposing the separator between the cathode and the anode. A plurality of the battery assemblies may be stacked in a bi-cell structure, and then impregnated with an organic electrolytic solution, and the resultant structure is housed in a pouch and sealed, thereby completing manufacturing of a lithium ion polymer battery.

In addition, the battery assemblies may be stacked on each other to form a battery pack, and the battery pack may be used in high-capacity and high-performance devices, such as a notebook computer, a smart phone, an electric vehicle (EV), etc.

Since the lithium battery has enhanced high-temperature charge and discharge characteristics and high-temperature stability, the lithium battery is suitable for use in an EV. For example, the lithium battery may be used in a hybrid vehicle such as a plug-in hybrid electric vehicle (PHEV).

A method of preparing a cathode active material, according to an embodiment, mixing a lithium precursor, a manganese precursor, a boron-based compound, and optionally a dopant precursor to prepare a mixture; and calcinating the mixture at a temperature of from about 700 to about 900° C.

The addition of the boron-based compound in the manufacturing process as described above enables production of an active material powder having an increased particle diameter and crystallinity even at low temperature.

In the method, a lithium precursor, a manganese precursor, and a boron-based compound are mixed to prepare a mixture, and a dopant precursor is additionally added to the mixture. In this regard, the addition of the dopant precursor is optional.

For example, the method may not include a separate process of mixing the manganese precursor and the dopant precursor.

An amount of the boron-based compound may be about 0.1 to about 10 weight (wt.) % based on the total weight of the mixture. For example, an amount of the boron-based compound may be from about 0.5 to about 10 wt. % based on the total weight of the mixture. For example, an amount of the boron-based compound may be about 0.5 to 5 wt. % based on the total weight of the mixture. For example, an amount of the boron-based compound may be from about 0.5 to about 2 wt.

% based on the total weight of the mixture. When an amount of the boron-based compound is 0.5 wt. % or more based on the total weight of the mixture, a battery including the cathode active material has more enhanced charge and discharge characteristics and high high-temperature stability.

The boron-based compound may include one or more compounds selected from the group consisting of $B_2O_3$, $H_3BO_3$, and $Li_2B_4O_7$, but is not limited thereto. For example, the boron-based compound may be any one of various compounds that include a boron element in the art.

The dopant precursor, which is optionally used in the method, may include at least one selected from the group consisting of Al, Co, Ni, Cr, Fe, Zn, Mg, and Li. For example, the dopant may include $Al_2O_3$. An amount of the dopant precursor may be about 0.5 to about 2.5 wt. % based on the total weight of the mixture, but is not limited thereto.

For example, the calcination may be performed at a temperature of about 700 to about 900° C. For example, the calcination may be performed at a temperature of about 800 to about 900° C. For example, the calcination may be performed at a temperature of about 700 to about 800° C.

The calcination in the method may be performed in air for about 5 to about 30 hours. For example, the calcination may be performed in dry air for about 15 to about 25.

For example, the cathode active material may be prepared by calcinating a mixture including $Li_2CO_3$ as a lithium precursor; $MnO_2$, $Mn_3O_4$, or $Mn_2O_3$ as a manganese precursor; $Li_2B_4O_7$ or $H_3BO_3$ as a boron-based compound; and optionally, MgO, NiO, or $Al_2O_3$ in air at a temperature of about 700 to about 900° C. for about 5 to about 30 hours.

The present embodiments will be described in further detail with reference to the following examples. These examples are for illustrative purposes only and are not intended to limit the scope of the present embodiments.

Preparation of Cathode Active Material

Example 1

Preparation of $Li_{1.05}Mn_{1.85}Al_{0.1}O_4$

A lithium carbonate ($Li_2CO_3$), a manganese dioxide ($MnO_2$), an alumina ($Al_2O_3$), and a boric acid ($H_3BO_3$) were used as starting materials.

In order to prepare 175.81 mol of $Li_{1.05}Mn_{1.85}Al_{0.1}O_4$, a lithium carbonate ($Li_2CO_3$), a manganese dioxide ($MnO_2$), and an alumina ($Al_2O_3$) were mixed in such amounts that a mole ratio of Li:Mn:Al was 1.05:1.85:0.1, and then, a boric acid was added thereto to prepare a mixture. An amount of the boric acid in the mixture was 0.5 wt. % based on the total weight of the mixture.

Figure 2A:
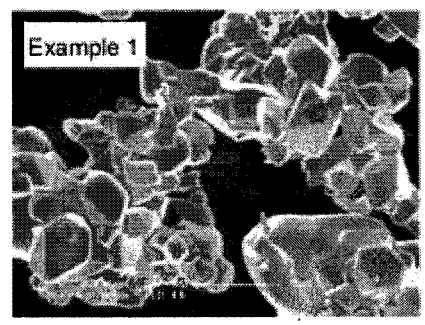
FIG. 2A is a scanning electron microscope (SEM) image of a cathode active material powder prepared according to Example 1.

The starting materials were mixed in a mortar, and the mixture was heat treated in a furnace while dry air was supplied thereto at a temperature of 800° C. for 20 hours to prepare a cathode active material. The cathode active material was cooled in the furnace. An average primary particle diameter of the cathode active material powder was 6 μm. The average primary particle diameter was measured based on a SEM image of the cathode active material. FIG. 2A shows an SEM image of primary particles of the cathode active material prepared according to Example 1.

Example 2

A cathode active material primary particle was prepared in the same manner as in Example 1, except that an amount of the boric acid was 0.3 wt. %. A diameter of the cathode active material primary particle was 1 μm.

Example 3

A cathode active material primary particle was prepared in the same manner as in Example 1, except that an amount of the boric acid was 0.7 wt. %. A diameter of the cathode active material primary particle was 8 μm.

Example 4

A cathode active material primary particle was prepared in the same manner as in Example 1, except that an amount of the boric acid was 1.0 wt. %. A diameter of the cathode active material primary particle was 9 μm.

Example 5

A cathode active material primary particle was prepared in the same manner as in Example 1, except that a heat treatment temperature was 700° C. A diameter of the cathode active material primary particle was 3 μm.

Example 6

A cathode active material primary particle was prepared in the same manner as in Example 1, except that a heat treatment temperature was 900° C. A diameter of the cathode active material primary particle was 7 μm.

Comparative Example 1

Figure 2B:
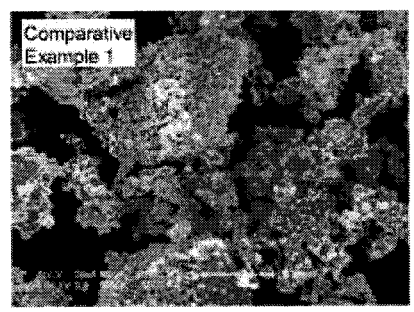
FIG. 2B is a SEM image of a cathode active material powder prepared according to Comparative Example 1.

A cathode active material primary particle was prepared in the same manner as in Example 1, except that a boric acid was not used. A diameter of the cathode active material primary particle was 0.2 μm. FIG. 2B shows an SEM image of primary particles of the cathode active material prepared according to Comparative Example 1.

Comparative Example 2

A cathode active material primary particle was prepared in the same manner as in Example 1, except that $AlF_3$ was used instead of a boric acid. A diameter of the cathode active material primary particle was 0.2 μm.

Comparative Example 3

0.5 mole of manganese sulfate was added to 3.5 mole of sodium hydroxide at a nitrogen atmosphere to produce a manganese hydroxide. In this regard, the entire amount of the mixture was set to 1 L. The manganese hydroxide was matured at a temperature of 90° C. for 1 hour. After the maturation, air was supplied thereto to oxidize the manganese at a temperature of 90° C. Then, the resultant product was washed and dried to produce manganese oxide particle powder.

A water suspension including the manganese oxide particle was washed with water having a weight 5 times greater than a weight of the manganese oxide by using a filter press, and then diluted until a concentration of the manganese oxide particle was 10 wt. %. 0.2 mol/l of a sodium aluminate aqueous solution was continuously supplied to the resultant suspension in a reaction vessel until a ratio of Mn:Al was 95:5. In the reaction vessel, stirring was continuously performed by using a stirrer, and at the same time, 0.2 mol/l sulfuric acid aqueous solution was automatically supplied thereto to adjust a pH to be 8±0.5, thereby preparing a suspension including manganese oxide coated with aluminum hydroxide.

The suspension was washed with water having a weight 10 times greater than a weight of the manganese oxide by using a filter press, and then dried, thereby preparing manganese oxide particles coated with aluminum hydroxide.

The aluminum hydroxide-coated $Mn_3O_4$ particle powder, a lithium carbonate, and a boric acid were dry-mixed for 1 hour to prepare a uniform mixture. In this regard, amounts of the aluminum hydroxide-coated $Mn_3O_4$ particle powder, the lithium carbonate, and the boric acid were controlled such that a ratio of Li:Mn:Al was 1.072:1.828:0.10 and a ratio of boron in the boric acid to Mn was 2.0 mol %. 30 g of the obtained mixture was placed in an alumina crucible, and maintained at a temperature of 960° C. in air for 3 hours. As a result, a cathode active material particle powder was obtained. A diameter of the cathode active material primary particle was 5.0 μm.

Preparation of Cathode and Lithium Battery

Example 7

The cathode active material powder prepared according to Example 1 and a carbonaceous conducting agent (Ketjen Black; EC-600JD) were uniformly mixed at a weight ratio of 93:3 and then, a polyvinylidene fluoride (PVDF) binder solution was added thereto, thereby preparing a cathode active material slurry in which a weight ratio of the cathode active material:carbon conductive agent:binder was 93:3:4.

An aluminum foil having a thickness of 15 μm was coated with the active material slurry and dried to prepare a cathode plate, and then the cathode plate was additionally vacuum dried to manufacture a coin cell having a diameter of 12 mm.

In manufacturing the coin cell, metal lithium was used as a counter electrode, a polypropylene separator (Cellgard® 3510) was used as a separator, and 1.3M $LiPF_6$ dissolved in a mixed solvent including ethylene carbonate (EC) and diethylene carbonate (DEC at a volumetric ratio of 3:7 was used as an electrolyte.

Examples 8 to 12

Lithium batteries were manufactured in the same manner as in Example 7, except that the cathode active material powders prepared according to Examples 2 to 6 were used in the same manner as in Example 7.

Comparative Example 4

A lithium battery was manufactured in the same manner as in Example 7, except that the cathode active material powder prepared according to Comparative Example 1 was used.

Comparative Examples 5 and 6

Lithium batteries were manufactured in the same manner as in Comparative Example 4, except that the cathode active material powders prepared according to Comparative Examples 2 and 3 were used.

Evaluation Example 1

XRD Test

An XRD test was performed on the cathode active material powders prepared according to Example 1 and Comparative Example 1. The test was performed using a CuK-alpha characteristic X-ray wavelength of 1.541 Å.

Figure 1B:
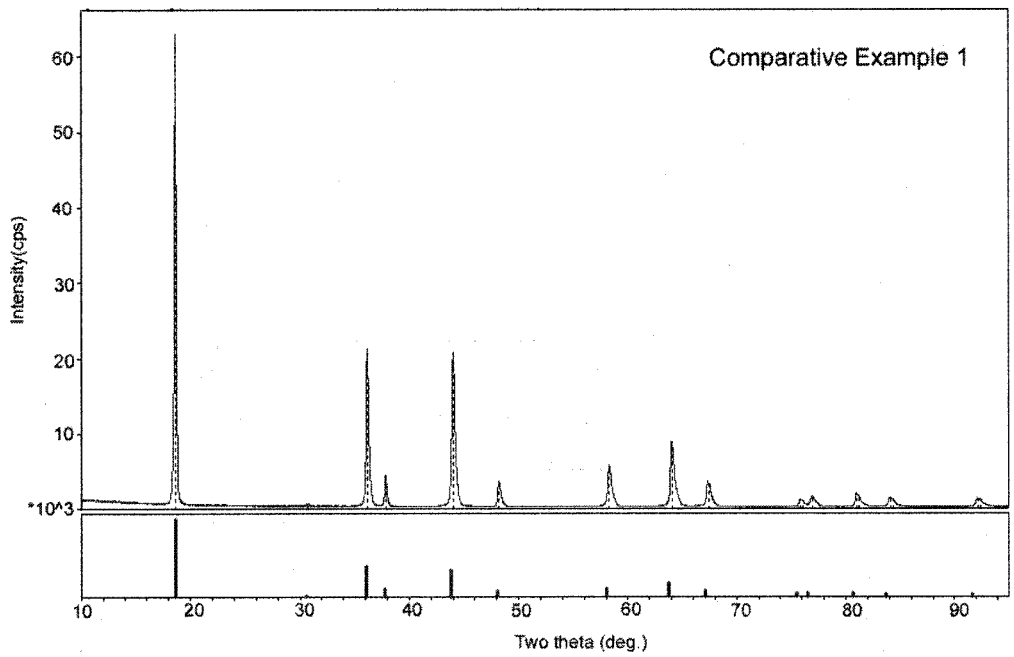
FIG. 1B is an XRD spectrum of a cathode active material powder prepared according to Comparative Example 1.

As shown in FIGS. 1A and 1B, the cathode active material primary particles prepared according to Example 1 and Comparative Example 1 have a peak corresponding to a (111) crystal plane at bragg 2θ of 18.5±1° and a peak corresponding to a (311) crystal plane at a bragg angle 2θ of 36.2±0.2°.

As shown in FIG. 1A, regarding the cathode active material primary particle of Example 1, a peak intensity ratio of the peak corresponding to the (111) crystal plane to the peak corresponding to the (311) crystal plane, that is, I(111)/I(311) was 2.53, and a FWHM of a peak at a bragg 2θ of 36.2±0.2° was 0.3±0.05°.

On the other hand, as shown in FIG. 1B, regarding the cathode active material primary particle of Comparative Example 1, a FWHM of a peak at a bragg 2θ of 36.2±0.2° was 0.7±0.05°.

For example, the cathode active material of Example 1 has better crystallinity and thus smaller FWHM than the cathode active material of Comparative Example 1.

Evaluation Example 2

Evaluation of BET Specific Surface Area

A BET specific surface area of each of the cathode active material powders prepared according to Examples 1 to 6 and Comparative Examples 1 and 2 was evaluated and the results are shown in Table. 1 below.

TABLE 1

| | Specific surface area [m²/g] |
|---|---|
| Example 1 | 0.461 |
| Example 2 | 0.824 |
| Example 3 | 0.385 |
| Example 4 | 0.298 |
| Example 5 | 0.622 |
| Example 6 | 0.378 |
| Comparative Example 1 | 2.879 |
| Comparative Example 2 | 1.465 |

As shown in Table 1, the cathode active materials prepared according to Examples 1 to 6 had smaller specific surface areas than the cathode active materials prepared according to Comparative Examples 1 and 2.

Evaluation Example 3

Evaluation of Average Particle Diameter (D50)

An average particle diameter (D50) of a secondary particle, which was determined based on a volume, of each of the cathode active materials prepared according to Examples 1 to 4, and 6 and Comparative Examples 1 and 2 was evaluated by using a laser particle size distribution evaluation apparatus, and the results are shown in Table 2 below. The secondary particle refers to a particle formed by an agglomeration a plurality of primary particles to each other.

TABLE 2

| | Secondary particle average diameter (D50) [μm] |
|---|---|
| Example 1 | 13.9 |
| Example 2 | 13.7 |
| Example 3 | 15.3 |

TABLE 2-continued

|  | Secondary particle average diameter (D50) [μm] |
| --- | --- |
| Example 4 | 14.5 |
| Example 6 | 14.4 |
| Comparative Example 1 | 5.26 |
| Comparative Example 2 | 8.95 |

As shown in Table 2, the cathode active materials prepared according to Examples 1 to 4, and 6 had greater secondary particle average particle diameter than the cathode active materials prepared according to Comparative Examples 1 and 2.

Evaluation Example 4

Boron Content Evaluation

An amount of a boron element included in each of the cathode active materials prepared according to Examples 1 to 4 and Comparative Example 1 was measured by using ion coupled plasma (ICP), and the results are shown in Table 3 below.

TABLE 3

|  | Amount of residual boron element [ppm] |
| --- | --- |
| Example 1 | 882 |
| Example 2 | 456 |
| Example 3 | 1326 |
| Example 4 | 1761 |
| Comparative Example 1 | — |

As shown in Table 3, the cathode active materials of Examples 1 to 4 included about 400 to about 2000 ppm of the boron element. However, the cathode active material of Comparative Example 1 did not include boron.

Evaluation Example 5

High-Temperature Lifetime Characteristics Evaluation

The lithium batteries prepared according to Examples 7 to 12 and Comparative Examples 4 to 6 were charged and discharged twice with a constant current at a 0.1 C rate within a voltage range of 3 to 4.3 V with respect to lithium metal at a temperature of 25° C. (formation process).

Subsequently, the lithium batteries were charged and discharged 100 times with a constant current at a 1 C rate within a voltage range of about 3 to about 4.3V with respect to lithium metal at a temperature of 60° C., and the results are shown in Table 4 below.

A capacity retention rate is represented by Equation 1 below.

Capacity retention rate [%]=[discharge capacity in a $100^{th}$ cycle/discharge capacity in a first cycle]×100  <Equation 1>

TABLE 4

|  | Capacity retention rate [%] |
| --- | --- |
| Example 7 | 98.2 |
| Example 8 | 95.7 |

TABLE 4-continued

|  | Capacity retention rate [%] |
| --- | --- |
| Example 9 | 97.8 |
| Example 10 | 96.1 |
| Example 11 | 97.3 |
| Example 12 | 95.4 |
| Comparative Example 4 | 93.6 |
| Comparative Example 5 | 94.2 |
| Comparative Example 6 | 91.4 |

As shown in Table 4, the lithium batteries of Examples 7 to 12 had better high-temperature lifetime characteristics than the lithium batteries of Comparative Examples 4 to 6.

Evaluation Example 6

High-Temperature Stability Evaluation

The lithium batteries prepared according to Examples 7 to 12 and Comparative Examples 4 to 6 were charged and discharged twice with a constant current at a 0.1 C rate within a voltage range of 3 to 4.3 V with respect to lithium metal at a temperature of 25° C. (formation process).

The lithium batteries that had been subjected to the formation process were charged with 0.1 C rate of a constant current at a temperature of 25° C. until a voltage with respect to lithium metal reached 4.3 V, and then discharged with a constant current at a 0.1 C rate until a voltage reached 3.0 V. The discharge capacity was used as a reference capacity. The charge and discharge cycle was regarded as a first cycle.

Then, the lithium batteries were charged with a constant current at a 0.1 C rate until a voltage with respect to lithium metal reached 4.3 V, and placed in an oven at a temperature of 60° C. for 4 weeks, and then, discharged with a constant current at a 0.1 C rate at a temperature of 25° C. until a voltage with respect to lithium metal reached 3.0 V, The charge and discharge cycle was regarded as a second cycle.

Then, the lithium batteries were charged with a constant current at a 0.1 C rate until a voltage with respect to lithium metal reached 4.3 V, and then discharged with a constant current at a 0.1 C rate until a voltage reached 3.0 V. The charge and discharge cycle was regarded as a third cycle.

The charge and discharge results are shown in Table 5 below. Recovery ratio is calculated by using Equation 3.

Capacity recovery ratio [%]=[discharge capacity at the third discharging cycle/discharge capacity discharge capacity at first discharging cycle (reference capacity)]×100  <Equation 3>

TABLE 5

|  | Capacity recovery ratio [%] |
| --- | --- |
| Example 7 | 99.1 |
| Example 8 | 97.9 |
| Example 9 | 98.8 |
| Example 10 | 98.3 |
| Example 11 | 98.9 |
| Example 12 | 97.8 |
| Comparative Example 4 | 96.8 |
| Comparative Example 5 | 97.1 |
| Comparative Example 6 | 93.4 |

As shown in Table 5, the lithium batteries of Examples 7 to 12 had enhanced high-temperature stability compared to the lithium batteries of Comparative Examples 4 to 6.

As described above, according to the one or more of the above embodiments, a cathode active material has an increased primary particle diameter, and thus, a lithium battery including the cathode active material has enhanced high-temperature cycle characteristics and high-temperature stability.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A cathode active material comprising:
 a lithium manganese oxide comprising primary particles having a diameter of 6 μm to 10 μm and which has a spinel structure in which an X-ray diffraction (XRD) peak intensity ratio of I(111)/I(311) is about 1.0 or more; and
 a boron element disposed on at least one position selected from the group consisting of inside the primary particles and on surfaces of the primary particles,
 wherein a specific surface area of the cathode active material is from about 0.2 m2/g to about 0.385 m2/g.

2. The cathode active material of claim 1, wherein the XRD peak intensity ratio of I(111)/I(311) is from about 1.5 to about 3.0.

3. The cathode active material of claim 1, wherein a full wide at half maximum (FWHM) of a peak at a bragg angle 2θ of 36.2±0.2° with respect to a CuK-alpha characteristic X-ray wavelength of 1.541 Å is about 0.6 or less.

4. The cathode active material of claim 1, wherein an average secondary particle diameter (D50) of the lithium manganese oxide is from about 10 μm to about 20 μm.

5. The cathode active material of claim 1, wherein an amount of the boron element is from about 1 ppm to about 2000 ppm based on the total weight of the cathode active material.

6. The cathode active material of claim 1, wherein the lithium manganese oxide is represented by Formula 1 below:

$Li_xMn_{2-y}M_yO_4$ 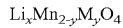 <Formula 1> where $0.9 \leq x \leq 1.4$ and $0 \leq y \leq 1$, and wherein M comprises one or more metal selected from the group consisting of Al, Co, Ni, Cr, Fe, Zn, Mg, and Li.

7. The cathode active material of claim 1, wherein the lithium manganese oxide is represented by Formula 2 below:

$Li_xMn_{2-y}Al_yO_4$ 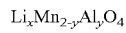 <Formula 2> wherein $0.9 \leq x \leq 1.4$ and $0 \leq y \leq 1$.

8. A cathode comprising the cathode active material of claim 1.

9. A lithium battery comprising the cathode of claim 8.

10. A method of preparing the cathode active material of claim 1, the method comprising:
 mixing a lithium precursor, a manganese precursor, a boron-based compound prepare a mixture; and
 calcinating the mixture at a temperature of from about 700° C. to about 900° C.

11. The method of claim 10, further comprising mixing a dopant precursor with the lithium precursor, the manganese precursor, and the boron-based compound to prepare the mixture.

12. The method of claim 10, wherein the amount of the boron-based compound is from about 0.1 wt. % to about 10 wt. % based on the total weight of the mixture.

13. The method of claim 11, wherein an amount of the boron-based compound is from about 0.1 wt. % to about 10 wt. % based on the total weight of the mixture.

14. The method of claim 10, wherein the boron-based compound comprises at least one material selected from the group consisting of $B_2O_3$, $H_3BO_3$, and $Li_2B_4O_7$.

15. The method of claim 11, wherein the boron-based compound comprises at least one material selected from the group consisting of $B_2O_3$, $H_3BO_3$, and $Li_2B_4O_7$.

16. The method of claim 11, wherein the dopant precursor comprises at least one metal selected from the group consisting of Al, Co, Ni, Cr, Fe, Zn, Mg, and Li.

17. The method of claim 10, wherein the calcination is performed in air for about 5 to about 30 hours.

18. The method of claim 11, wherein the calcination is performed in air for about 5 to about 30 hours.

* * * * *